(12) United States Patent
Noda

(10) Patent No.: US 8,860,391 B2
(45) Date of Patent: Oct. 14, 2014

(54) DC-DC CONVERTER, AND POWER SUPPLY CIRCUIT HAVING DC-DC CONVERTER

(75) Inventor: Ippei Noda, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 707 days.

(21) Appl. No.: 13/133,192

(22) PCT Filed: Dec. 2, 2009

(86) PCT No.: PCT/JP2009/006549
§ 371 (c)(1),
(2), (4) Date: Jun. 7, 2011

(87) PCT Pub. No.: WO2010/073498
PCT Pub. Date: Jul. 1, 2010

(65) Prior Publication Data
US 2011/0241639 A1 Oct. 6, 2011

(30) Foreign Application Priority Data
Dec. 26, 2008 (JP) ................. 2008-332650

(51) Int. Cl.
G05F 1/00 (2006.01)
G05F 3/16 (2006.01)
G05F 3/20 (2006.01)
H03F 1/08 (2006.01)
H02M 3/156 (2006.01)

(52) U.S. Cl.
CPC ................... *H02M 3/156* (2013.01)
USPC ............. 323/282; 323/315; 330/292

(58) Field of Classification Search
USPC ................ 323/282, 312–317; 330/292
See application file for complete search history.

(56) References Cited

U.S. PATENT DOCUMENTS

| 4,800,339 | A | 1/1989 | Tanimoto et al. | |
|---|---|---|---|---|
| 7,151,363 | B1 * | 12/2006 | Scott et al. | 323/282 |
| 7,218,083 | B2 * | 5/2007 | Wang et al. | 323/273 |
| 7,944,194 | B2 * | 5/2011 | Huang et al. | 323/313 |

(Continued)

FOREIGN PATENT DOCUMENTS

| JP | 63-153903 | 6/1988 |
|---|---|---|
| JP | 2006-94572 | 4/2006 |

(Continued)

OTHER PUBLICATIONS

International Search Report and Written Opinion in PCT/JP2009/006549, Feb. 2, 2010.

*Primary Examiner* — Jue Zhang
*Assistant Examiner* — Lakaisha Jackson
(74) *Attorney, Agent, or Firm* — Cooper & Dunham LLP

(57) ABSTRACT

A DC-DC converter converts an input voltage input from an input terminal to a predetermined voltage and outputs the converted voltage from an output terminal, the DC-DC converter including an output control transistor and an operation control circuit that has an error amplifying circuit, whereby the error amplifying circuit includes an output circuit configured to output an error voltage and include an output transistor of a source follower connection, a series circuit configured to include a resistor for phase compensation and a capacitor for phase compensation and be connected between a control electrode of the output circuit and a grounding voltage terminal, and an amplifying circuit configured to be positioned on a side more distant from a side outputting the error voltage relative to the output circuit in the error amplifying circuit, and include a voltage generating element as a load of the amplifying circuit.

12 Claims, 8 Drawing Sheets

(56) References Cited

U.S. PATENT DOCUMENTS

| | | | |
|---|---|---|---|
| 7,973,605 B2* | 7/2011 | Dasgupta | 330/292 |
| 2004/0008528 A1* | 1/2004 | Umemoto et al. | 363/49 |
| 2005/0057309 A1* | 3/2005 | Gramegna | 330/292 |
| 2007/0222502 A1 | 9/2007 | Noda | |
| 2009/0066305 A1 | 3/2009 | Noda | |
| 2009/0115374 A1 | 5/2009 | Noda | |
| 2009/0128116 A1 | 5/2009 | Noda | |
| 2010/0046250 A1 | 2/2010 | Noda | |
| 2010/0060250 A1 | 3/2010 | Noda | |
| 2010/0066333 A1 | 3/2010 | Noda | |
| 2010/0231175 A1 | 9/2010 | Noda | |
| 2011/0018347 A1 | 1/2011 | Noda | |
| 2011/0018513 A1 | 1/2011 | Noda | |

FOREIGN PATENT DOCUMENTS

| | | |
|---|---|---|
| JP | 2007-236129 | 9/2007 |
| JP | 2008-199804 | 8/2008 |
| JP | 2009-71920 | 4/2009 |
| JP | 2009-130972 | 6/2009 |
| JP | 2009-219179 | 9/2009 |
| JP | 2009-258809 | 11/2009 |
| JP | 2009-261048 | 11/2009 |
| JP | 2010-51079 | 3/2010 |
| JP | 2010-51152 | 3/2010 |
| JP | 2010-63333 | 3/2010 |
| JP | 2010-68553 | 3/2010 |

* cited by examiner

Prior Art

Prior Art

DC-DC CONVERTER, AND POWER SUPPLY CIRCUIT HAVING DC-DC CONVERTER

TECHNICAL FIELD

The present invention generally relates to a DC-DC converter used in compact power supply hardware, and more particularly, to a DC-DC converter which can reduce an output voltage reduction when a load current rapidly increases and a power supply circuit having the DC-DC converter.

BACKGROUND ART

FIG. 7 illustrates a circuit example of a step-down switching regulator of a current mode control type. Referring to FIG. 7, a switching regulator 100 steps down an input voltage input to an input terminal IN to be a predetermined voltage and outputs the stepped down voltage as an output voltage Vo from an output terminal OUT.

FIG. 8 is a timing chart illustrating an example of operation of the switching regulator 100 illustrated in FIG. 7. Referring to FIG. 8, a referential mark Io designates an output current output from an output terminal OUT; a referential mark Ve designates an error voltage, which is an output voltage of an error amplifying circuit 120; a referential mark Vslp designates a slope voltage, which is an output voltage of a slope voltage generating circuit 110; a referential mark Set designates a set pulse signal, which is an output signal of an oscillating circuit 140, input to a set input terminal S of an RS flip-flop circuit 150; a referential mark Rst designates a reset pulse signal, which is an output signal of a PWM comparator 130, input to a reset input terminal R of the RS flip-flop circuit 150; and a referential mark S1 designates a gate signal of a switching transistor M101, which is a signal obtained by inverting an output signal output from an output terminal Q of the RS flip-flop circuit 150 using an inverter circuit 160.

Referring to FIG. 8, the set pulse signal Set is output from the oscillating circuit 140, which becomes a high level at predetermined time intervals. When the set pulse signal Set is input to the set input terminal S of the RS flip-flop circuit 150, the output terminal Q of the RS flip-flop circuit 150 outputs a signal of high level. Because the signal level of the signal is inverted by the inverter circuit 160, the gate signal S1 of the switching transistor M101 becomes a low level. Then, the switching transistor M101 is switched on and an input voltage Vi is input to a series circuit of an inductor L101 and an output capacitor C101.

An inductor current IL flowing through the inductor L101 linearly increases as time advances. When the inductor current IL increases to be more than the output current Io, electric charges are accumulated in the output capacitor C101, and the output voltage Vo increases. The slope voltage generating circuit 110 detects the inductor current IL, converts the inductor current IL to a voltage, and simultaneously generates a compensating voltage for avoiding a sub-harmonic oscillation. The slope voltage generating circuit 110 adds the compensating voltage to the voltage obtained by converting the inductor current IL to generate the slope voltage Vslp and outputs the slope voltage Vslp to the PWM comparator 130. The slope voltage Vslp linearly increases while the switching transistor M101 is switched on.

The error amplifying circuit 120 amplifies a difference voltage between an output voltage detecting signal Vfb and a reference voltage Vref and outputs the amplified voltage as an error voltage Ve. The PWM comparator 130 compares the error voltage Ve with the slope voltage Vslp, and outputs the signal Rst of high level when the slope voltage Vslp exceeds the error voltage Ve to reset the RS flip-flop circuit 150. Then, the output terminal Q of the RS flip-flop circuit 150 returns to the low level, and the gate signal S1 becomes the high level. Therefore, the switching transistor M101 is switched off.

When the switching transistor M101 is switched off, a voltage VLX of a connection node LX decreases to a minus voltage due to a function of a back electromotive force generated by the inductor L101. Then, a rectifying diode D101 is switched on to make energy accumulated in the inductor L101 flows out. Therefore, the inductor current IL linearly decreases as time advances. When the inductor current becomes smaller than the output current Io, electric power is supplied from the output capacitor C101 to a load 200 to thereby decrease the output voltage Vo. After a cycle, the set pulse signal Set is generated from the oscillating circuit 140 to switch the switching transistor M101 on again. Then, the inductor current IL is supplied to increase the output voltage Vo. Subsequently, similar operations are repeated.

Referring to FIG. 8, the output current Io is low before a time t2. The output current Io is decreased here. The output voltage Vo slightly increases as time advances while the output current Io is decreased. Therefore, the error voltage Ve further decreases and becomes a lower limit value of the slope voltage Vslp or less at the time t1. Then, the output signal Rst of the PWM comparator 130 becomes the high level to reset the RS flip-flop circuit 150. In this situation, since the signal level of the output terminal Q does not invert even though the set pulse Set is input to the set terminal S, the switching transistor M101 is not switched on.

When the output current Io rapidly increases at the time t2, the output voltage Vo decreases as illustrated in FIG. 8. However, the error voltage Ve of the error amplifying circuit 120 does not increase as much. This is because electric charges in a phase compensating capacitor Ch are discharged to be zero volts (0 V) while the error voltage Ve of the error amplifying circuit 120 is zero volts (0 V), and therefore the error voltage Ve does not rise until the capacitor Ch is charged to a predetermined voltage. For the reason, the gate signal S1, which switches on the switching transistor M101 upon a change of the output signal Rst to be the low level caused by an excess of the error voltage Ve over the lower limit value of the slope voltage Vslp, is first output at a time t3 after a time t2, when the output current Io rapidly increases, by a time period Td. Between the time t2 and the time t3, the output voltage substantially decreases.

In the related art described in, for example, Japanese Unexamined Patent Application Publication 2006-94572, a switch is provided to hold, or charge or discharge electric charges in a phase compensating capacitor included in a feed-back circuit of an error amplifying circuit. By operating the switch, a stabilization time for an error voltage output to a voltage comparator is shortened. In this way, an output voltage output to a load can be smoothly changed to a predetermined set voltage.

However, the technique described in the related art has problems such that the switch and a control circuit for controlling the switch are additionally necessary and an entire circuit becomes a large size. Further, it is possible to convert an input voltage to an output voltage and output the output voltage from an output terminal of a device determined by arbitrarily choosing a switching regulator or, under a light load, a second DC-DC converter having a power conversion efficiency higher than that of the switching regulator, or by choosing one of the switching regulator and the second DC-DC converter when a predetermined condition where a load current increases and decreases around a predetermined current, for example. However, when the second DC-DC converter is switched to be the switching regulator, there is a problem such that the output voltage Vo substantially decreases for the above reason.

DISCLOSURE OF INVENTION

Accordingly, it is a general object of the present invention to provide a novel and useful DC-DC converter and a power supply circuit, which can improve a response lag of an output voltage caused by a phase compensating capacitor in an error amplifying circuit, using a simple circuit.

The above object of the present invention may be achieved by a DC-DC converter which converts an input voltage input from an input terminal to a predetermined voltage and outputs the converted voltage from an output terminal, the DC-DC converter including an output control transistor that carries out operation corresponding to a control signal input to a control electrode and controls the output voltage, and an operation control circuit that has an error amplifying circuit for amplifying a voltage difference between a predetermined reference voltage and a feedback voltage generated by dividing the output voltage and outputting the amplified voltage, and controls operation of the output control transistor to cause the output voltage to constantly be the predetermined voltage based on an error voltage, the error voltage being the output voltage difference, whereby the error amplifying circuit includes an output circuit configured to output the error voltage and include an output transistor of a source follower connection, a series circuit configured to include a resistor for phase compensation and a capacitor for phase compensation and be connected between a control electrode of the output circuit and a grounding voltage terminal, and an amplifying circuit configured to be positioned on a side more distant from a side outputting the error voltage relative to the output circuit in the error amplifying circuit, and include a voltage generating element as a load of the amplifying circuit.

The above object of the present invention may also be achieved when the voltage generating element is a diode-connected MOS transistor.

The above object of the present invention may also be achieved when the voltage generating element is a resistor.

The above object of the present invention may also be achieved when the voltage generating element generates a voltage the same as or smaller than a threshold voltage value of the output transistor of the source follower connection.

The above object of the present invention may also be achieved when a threshold voltage value of the voltage generating element is the same as or smaller than a threshold voltage value of the output transistor of the source follower connection.

The above object of the present invention may also be achieved when a power supply circuit includes the DC-DC converter described above, a second DC-DC converter having a power conversion efficiency higher than a power conversion efficiency of the DC-DC converter under a light load, and a control circuit configured to control operation of the DC-DC converter and the second DC-DC converter, whereby the control circuit operates either one of the DC-DC converter and the second DC-DC converter arbitrarily or when a predetermined condition is established to cause the DC-DC converter or the second DC-DC converter generate the output voltage and output the generated voltage from the output terminal.

Other objects, features, and advantages of the present invention will become more apparent from the following detailed description when read in conjunction with the accompanying drawings.

BEST MODE FOR CARRYING OUT THE INVENTION

A description will now be given, with reference to FIG. 1 through FIG. 6, of the Embodiment of the present invention.

In the Embodiment, referential marks typically designate as follows: 1: Switching regulator; 2: Load; 7: reference voltage generating circuit; 10: Slope voltage generating circuit; 20: Error amplifying circuit; 30: PWM comparator; 40: Oscillating circuit; 50: RS flip-flop circuit; 60: Inverter circuit; 70: Second DC-DC converter; 71: control circuit; M1: Switching transistor; D1: Rectifying diode; L1: Inductor; C1: Output capacitor; R1, R2, Rh, R11: Resistor; Ch: Capacitor; M11 thru M16: PMOS Transistor; and M17 thru M25: NMOS Transistor.

Embodiment

Figure 1:
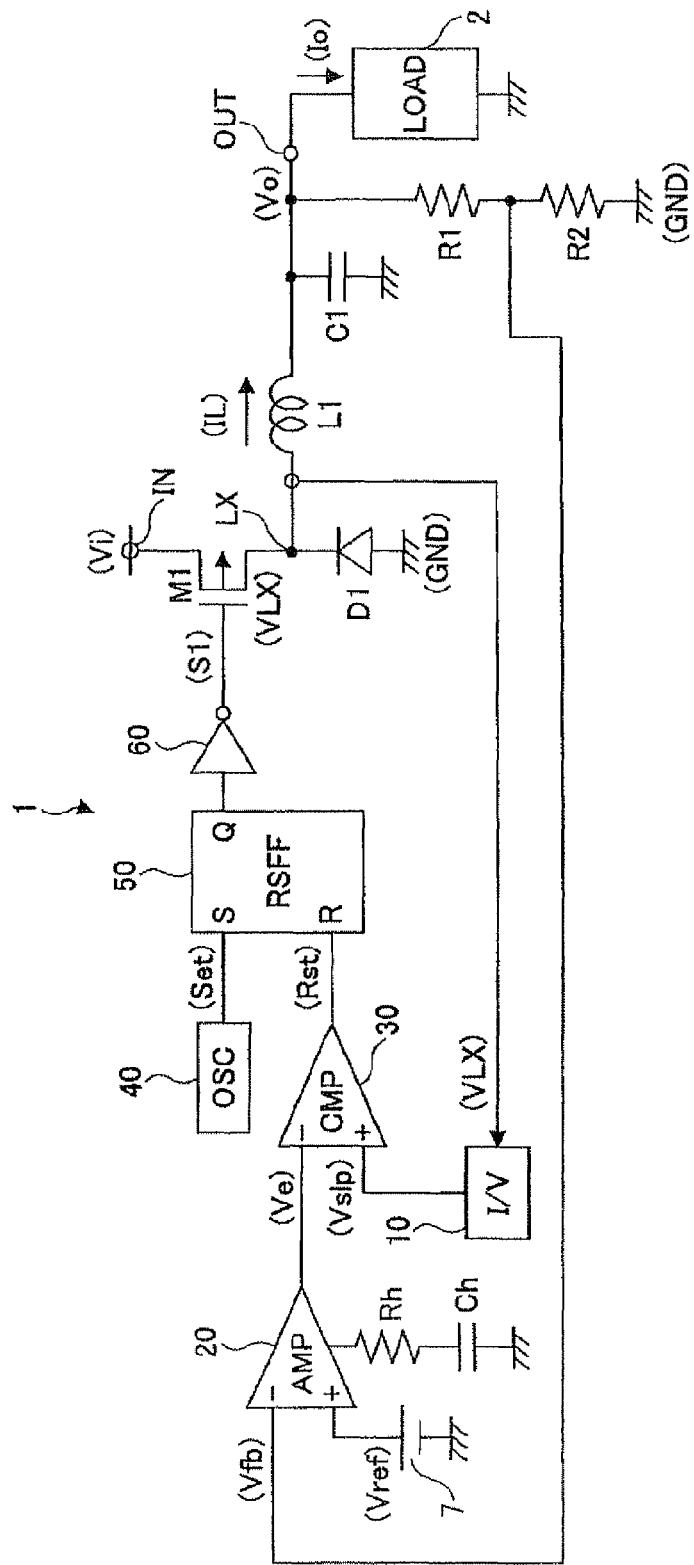
FIG. 1 illustrates a circuit example of a DC-DC converter of Embodiment 1.

FIG. 1 illustrates a circuit example of a switching regulator of Embodiment 1. The switching regulator 1 forming a DC-DC converter outputs from an output terminal OUT an output voltage Vo after stepping down an input voltage Vi inputted to an input terminal IN to a predetermined voltage. The switching regulator 1 is an asynchronous rectification type step-down switching regulator.

In the switching regulator 1, a series circuit of a switching transistor M1 and a rectifying diode D1 is connected between the input terminal IN and a grounding voltage GND. An inductor L1 is connected to a connection node LX between the switching transistor M1 and the rectifying diode D1. An output capacitor C1 is connected between the output terminal OUT and the grounding voltage GND. Further, a load 2 is connected between the output terminal OUT and the grounding voltage GND. When the switching transistor M1 is switched on and off, energy is accumulated in the inductor L1 and the output capacitor C1. The accumulated energy is output as the output voltage Vo and supplied to the load 2.

Further, an operation circuit unit for switching on or off the switching transistor M1 as an output controlling transistor includes voltage dividing resistors R1, R2 for detecting an output voltage, reference voltage generating circuit 7 for generating and outputting a reference voltage Vref, an error amplifying circuit 20 to which a feed-back voltage Vfb output from a connected portion between voltage dividing resistors R1 and R2 and the reference voltage Vref are input, a slope voltage generating circuit 10 for detecting a current flowing through the inductor L1, converting the detected current to a voltage, generating a slope voltage Vslp by providing a slope compensation to it, and outputting the generated slope voltage Vslp, a PWM comparator 30 for comparing the slope voltage Vslp output from the slope voltage generating circuit 10 and an error voltage Ve output from an error amplifying circuit 20, generating a reset pulse signal Rst indicative of a result of the comparison, and outputting the reset pulse signal Rst, an oscillating circuit 40 for generating a predetermined set pulse signal Set and outputting the set pulse signal Set, a RS flip-flop circuit 50 which is set by the set pulse signal Set output from the oscillating circuit 40 and reset by the reset pulse signal Rst output from the PWM comparator 30, and an inverter circuit 60 for inverting a signal output from an output terminal Q of the RS flip-flop circuit 50 and outputting the inverted signal. A resistor Rh connected to the error amplifying circuit 20 and a capacitor Ch carry out phase compensation of the switching regulator 1.

The set pulse signal Set is output from the oscillating circuit 40, and becomes a high level at predetermined time intervals. When the set pulse signal Set is input to a set input terminal S of the RS flip-flop circuit 50, the output terminal Q of the RS flip-flop circuit 50 outputs a signal of high level. Because the signal level of the signal is inverted by the inverter circuit 60, a gate signal S1 of the switching transistor M1 becomes a low level. Then, the switching transistor M1 is switched on and the input voltage Vi is input to a series circuit of the inductor L1 and the output capacitor C1.

An inductor current IL flowing through the inductor L1 linearly increases as time advances. When the inductor current IL increases to be more than an output current Io, electric charges are accumulated in the output capacitor C1, and the output voltage Vo increases. The slope voltage generating circuit 10 detects the inductor current IL, converts the inductor current IL to a voltage, and simultaneously generates a compensating voltage for avoiding a sub-harmonic oscillation. The slope voltage generating circuit 10 adds the compensating voltage to the voltage obtained by converting the inductor current IL to generate the slope voltage Vslp and outputs the slope voltage Vslp to the PWM comparator 30. The slope voltage Vslp linearly increases while the switching transistor M1 is switched on.

The error amplifying circuit 20 amplifies a difference voltage between the output voltage detecting signal Vfb and the reference voltage Vref and outputs the amplified voltage as the error voltage Ve. The PWM comparator 30 compares the error voltage Ve with the slope voltage Vslp, and outputs the signal Rst of high level when the slope voltage Vslp exceeds the error voltage Ve to reset the RS flip-flop circuit 50. Then, the output terminal Q of the RS flip-flop circuit 50 returns to the low level, and the gate signal S1 becomes the high level. Therefore, the switching transistor M1 is switched off.

When the switching transistor M1 is switched off, a voltage VLX of the connection node LX decreases to a minus voltage due to a function of a back electromotive force generated by the inductor L1. Then, the rectifying diode D1 is switched on to make energy accumulated in the inductor L1 flow out. Therefore, the inductor current IL linearly decreases as time advances. When the inductor current becomes smaller than the output current Io, electric power is supplied from the output capacitor C1 to the load 2 to thereby decrease the output voltage Vo. After a cycle of the set pulse signal Set generated by the oscillating circuit 40, the switching transistor M1 is switched on again. Then, the inductor current IL is supplied to increase the output voltage Vo. Subsequently, similar operations are repeated.

Figure 2:
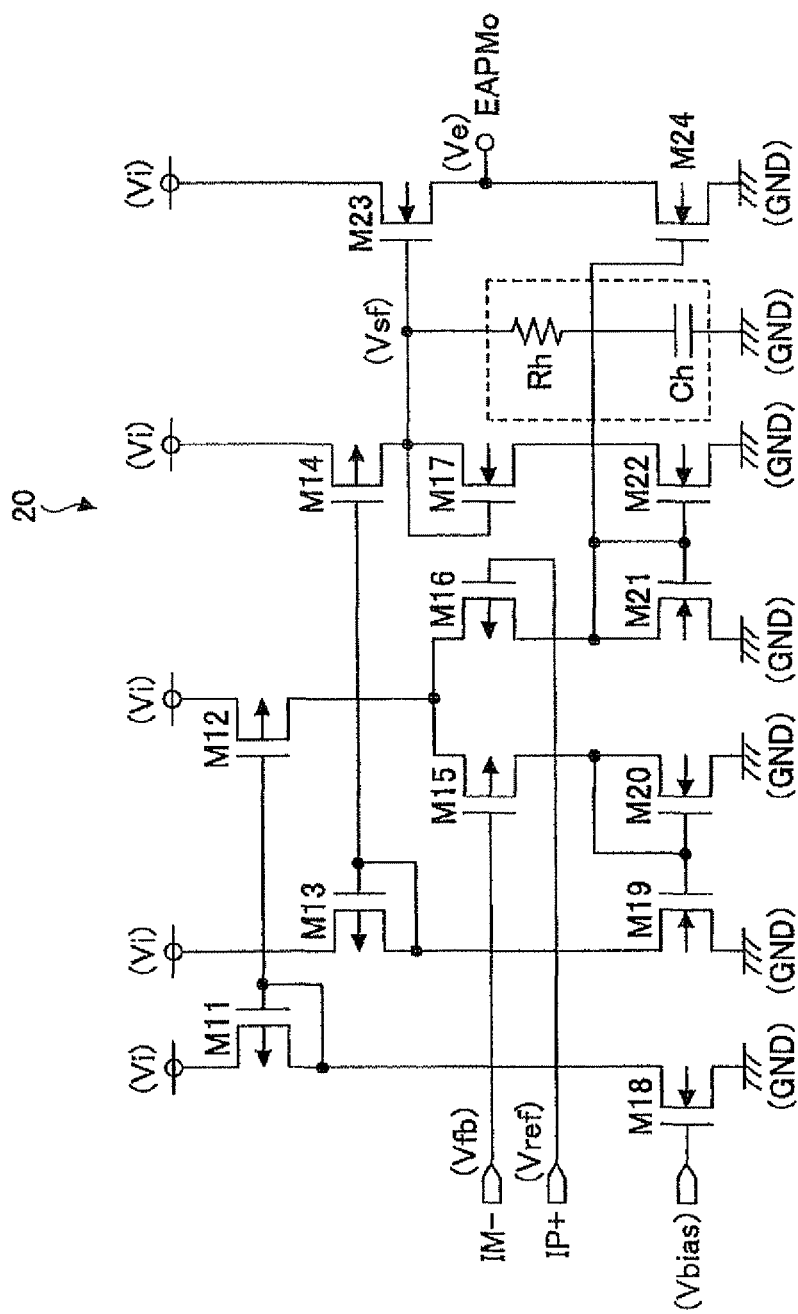
FIG. 2 illustrates a circuit example of an error amplifying circuit illustrated in FIG. 1.

FIG. 2 illustrates a circuit example of the error amplifying circuit 20 illustrated in FIG. 1. The error amplifying circuit 20 illustrated in FIG. 2 is configured to include PMOS transistors M11 thru M16, NMOS transistors M17 thru M24, a phase compensating capacitor Ch, and a phase compensating resistor Rh. A source of the NMOS transistor M18 is connected to the grounding voltage GND, a drain of the NMOS transistor M18 is connected to a drain of the PMOS transistor M11, and a gate of the NMOS transistor M18 receives a bias setup voltage Vbias for setting a bias voltage of the error amplifying circuit 20.

A source of the PMOS transistor M11 is connected to receive the input voltage Vi, a gate of the PMOS transistor M11 is connected to a drain of the PMOS transistor M11 itself and a gate of the PMOS transistor M12. Since the source of the PMOS transistor M12 is connected to receive the input voltage Vi, a current mirror circuit is formed of the PMOS transistors M11 and M12. Further, a drain of the PMOS transistor M12 is connected to a connected portion where sources of the PMOS transistors M15 and M16 are connected.

The PMOS transistors M15 and M16 are transistors for receiving differential inputs to the error amplifying circuit 20. A gate of the PMOS transistor M15 is an inverting input terminal IM−, and a feed-back voltage Vfb is input to the inverting input terminal IM−. Further, a gate of the PMOS transistor M16 is a noninverting input terminal IP+, and a reference voltage Vref is input to the noninverting input terminal IP+. A drain of the PMOS transistor M15 is connected to a drain of the NMOS transistor M20, and a drain of the PMOS transistor M16 is connected to a drain of the NMOS transistor M21.

A source of the NMOS transistor M20 is connected to the grounding voltage GND, and a gate of the NMOS transistor M20 is connected to a drain of the NMOS transistor M20 itself and a gate of the NMOS transistor M19. Since the source of the NMOS transistor M19 is connected to the grounding voltage GND, a current mirror circuit is made up of the NMOS transistors M20 and M19. A drain of the NMOS transistor M19 is connected to a drain of the PMOS transistor M13.

A source of the PMOS transistor M13 is connected to receive the input voltage Vi, a gate of the PMOS transistor M13 is connected to a drain of the PMOS transistor M13 itself and a gate of the PMOS transistor M14. Since the source of the PMOS transistor M14 is connected to receive the input voltage Vi, a current mirror circuit is made up of the PMOS transistors M13 and M14. A drain of the PMOS transistor M14 is connected to a gate of the NMOS transistor M23 and a drain of the NMOS transistor M17. The drain of the PMOS transistor M14 is an output terminal of the differential amplifier circuit forming a front stage of the amplifying circuit of the error amplifying circuit 20.

A gate of the NMOS transistor M17 is connected to the drain of the NMOS transistor M17 itself and a source of the NMOS transistor M17 is connected to a drain of the NMOS transistor M22. The NMOS transistor M17 is a voltage generating element in the Embodiment. In the related art, the drain of the PMOS transistor M14 is directly connected to a drain of the NMOS transistor M22. The NMOS transistor M22 works as a load for an output circuit of the differential amplifier circuit. A source of the NMOS transistor M22 is connected to the grounding voltage GND and a gate of the NMOS transistor M22 is connected to a gate of the NMOS transistor M21. A current mirror circuit is made up of the NMOS transistors M22 and M21 since the gate of the NMOS transistor M21 is connected to the drain of the NMOS transistor M21 itself.

A drain of the NMOS transistor M23 is connected to receive the input voltage Vi, and a source of the NMOS transistor M23 is connected to a drain of the NMOS transistor M24. Further, the series circuit of the phase compensating resistor Rh and the phase compensating capacitor Ch is connected between a gate of the NMOS transistor M23 and the grounding voltage GND. The phase compensating resistor Rh and the phase compensating capacitor Ch compensate for a phase of the switching regulator 1. A source of the NMOS transistor M24 is connected to the grounding voltage GND, and a gate of the NMOS transistor M24 is connected to the gates of the NMOS transistors M21 and M22. Therefore, a current mirror circuit is made up of the NMOS transistors M21 and M22.

The error voltage Ve is output from the source of the NMOS transistor M23, which is an output terminal EAPMo of the error amplifying circuit 20. Said differently, an output circuit of the error amplifying circuit 20 forms a source follower circuit of the NMOS transistor M23 having a current load of the NMOS transistor M24. The NMOS transistors M23 and M24 form the output circuit, and the PMOS transistors M13 and M14 and the NMOS transistors M17, M19 and M22 form the output circuit of the differential amplifier circuit, which is an amplifying circuit, and the NMOS transistors M22 is a load of the amplifying circuit.

Next, an operation of the error amplifying circuit 20 is described. Since the bias voltage Vbias is input to a gate of the NMOS transistor M18, a drain current of the NMOS transistor M18 becomes a constant value corresponding to the bias voltage Vbias. The constant current is supplied as a bias current of the PMOS transistors M15 and M16 forming the differential amplifier circuit via the PMOS transistors M11 and M12. Drain currents of the PMOS transistors M15 and M16 are obtained by dividing the bias current in half. When gate voltages of the PMOS transistors M15 and M16 are equal, the halves of the bias current are evenly supplied to the PMOS transistors M15 and M16.

The drain current of the PMOS transistor M15 is supplied as a drain current of the NMOS transistor M20, which is a load of the PMOS transistor M15. The drain current of the PMOS transistor M16 is supplied as a drain current of the NMOS transistor M21, which is a load of the PMOS transistor M16. Drain currents of the PMOS transistors M15 and M16 are obtained by dividing the bias current in half. When gate voltages of the PMOS transistors M15 and M16 are equal, the halves of the bias current are evenly supplied to the PMOS transistors M15 and M16.

Since the PMOS transistors M13 and M14 form the current mirror circuit, the drain current of the PMOS transistor M14 becomes proportional to the drain current of the PMOS transistor M15. Since the NMOS transistors M21, M22 and M24 configure the current mirror circuit, the drain current of the NMOS transistor M22 becomes proportional to the drain current of the PMOS transistor M16. As described, the drain current of the PMOS transistor M14 becomes proportional to the drain current of the NMOS transistor M15, and the drain current of the NMOS transistor M22 becomes proportional to the drain current of the PMOS transistor M16.

Since the halves of the bias current are evenly supplied to the PMOS transistors M15 and M16, when the gate voltages of the PMOS transistors M15 and M16 are equal, the drain currents of the PMOS transistors M15 and M16 become equal. As a result, the drain currents of the PMOS transistor M14 and the drain current of the NMOS transistor M22 become equal, and the drain voltage Vsf of the PMOS transistor M14 becomes an intermediate voltage between the input voltage Vi and the grounding voltage GND.

Provided that the gate voltage Vfb of the PMOS transistor M15 is larger than the gate voltage Vref of the PMOS transistor M16, the drain current of the PMOS transistor M15 decreases and the drain current of the PMOS transistor M16 increases. Then an impedance of the PMOS transistor M14 increases, and an impedance of the NMOS transistor M22 decreases. Therefore, the voltage Vsf decreases and the error voltage Ve decreases. On the contrary, provided that the gate voltage Vfb of the PMOS transistor M15 is smaller than the gate voltage Vref of the PMOS transistor M16, the drain current of the PMOS transistor M15 increases and the drain current of the PMOS transistor M16 decreases. Then an impedance of the PMOS transistor M14 decreases, and an impedance of the NMOS transistor M22 increases. Therefore, the voltage Vsf increases and the error voltage Ve also increases.

Figure 3:
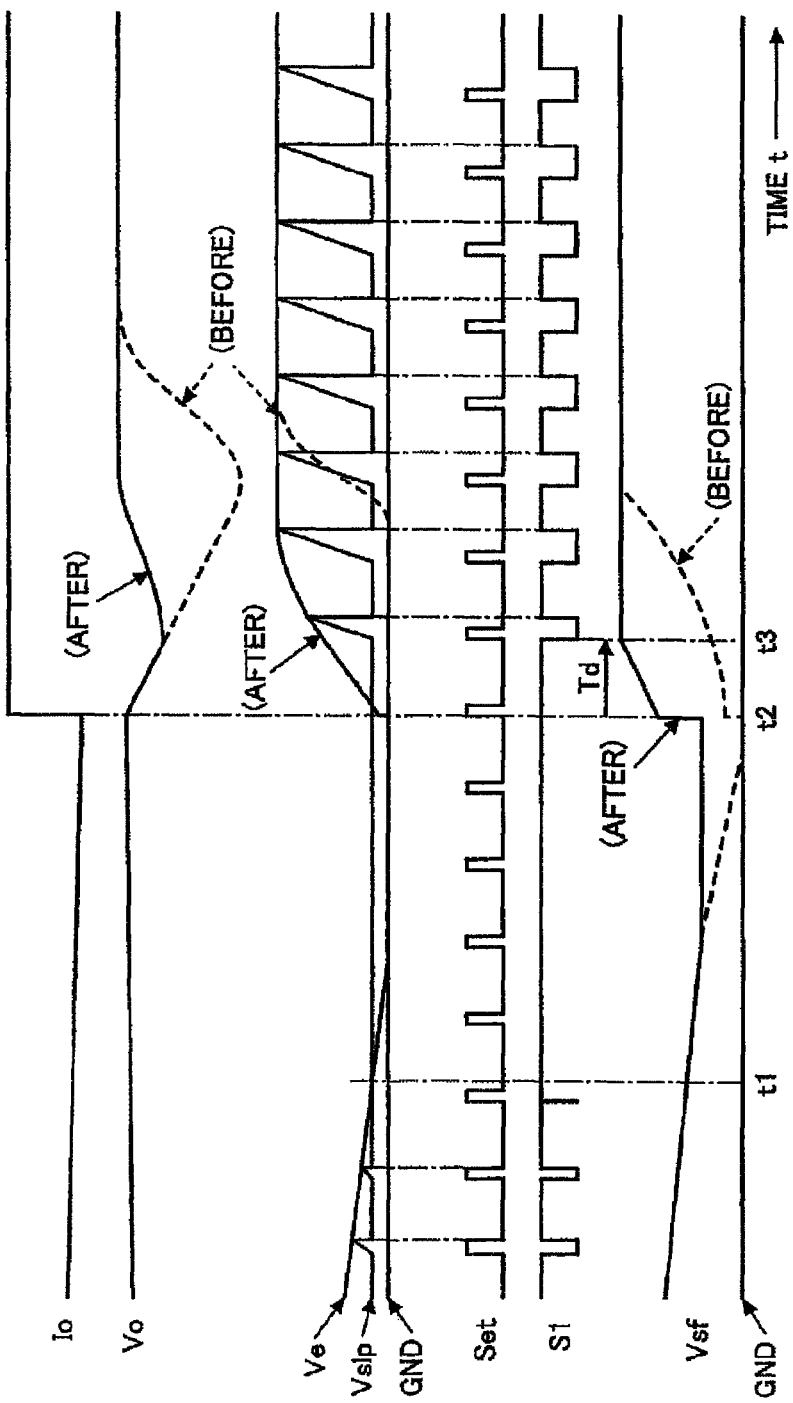
FIG. 3 is a timing chart illustrating an example of operation of a switching regulator using the error amplifying circuit illustrated in FIG. 2.

FIG. 3 is a timing chart explaining operations of the switching regulator 1 and the error amplifying circuit 20. Referring to FIG. 3, the output voltage Vo is increasing while the output current Io is decreased before the time t2 thereby increasing the gate voltage Vfb of the PMOS transistor M15 and decreasing the drain current of the PMOS transistor M15. Then, since the drain current of the PMOS transistor M16 increases, the voltage Vsf decreases and the error voltage Ve decreases along with the decrement of the voltage Vsf.

When the error voltage Ve becomes a lower limit value of the slope voltage Vslp or less at the time t1, most of the bias current of the differential amplifier circuit inside the error amplifying circuit 20 becomes the drain current of the PMOS transistor M16 and therefore the drain current of the PMOS transistor M15 approximately becomes zero amperes (0 A). Then, the drain current of the transistor M14 becomes approximately zero amperes (0 A). On the contrary, the NMOS transistor M22 tries to conduct a drain current substantially the same as the bias current. However, since the drain current of the PMOS transistor M14 is approximately zero amperes (0 A), the NMOS transistor M22 cannot conduct the drain current.

As a result, the voltage Vsf drops near the grounding voltage GND. At this time, electric charges in the capacitor Ch are discharged via the resistor Rh, and the NMOS transistors M17 and M22. Since the NMOS transistor M17 is a diode-connected transistor, when the voltage Vsf becomes a threshold voltage of the NMOS transistor M17 or less, a discharging current suddenly decreases to lower a dropping rate of the voltage Vsf. For these reasons, the voltage Vsf is, in many cases, slightly smaller than the threshold voltage of the NMOS transistor M17 at the time t2.

When the load current Io rapidly increases, the output voltage Vo decreases. A dropping rate of the output voltage is determined by a value of the output capacitor C1 and a value of the load current Io. When the output voltage Vo drops, the gate voltage Vfb of the PMOS transistor M15 drops to thereby increase a drain current of the PMOS transistor M15 and decrease the drain current of the PMOS transistor M16. Then, since the drain current of the PMOS transistor M14 increases the drain current flows through the NMOS transistor M17. Since the NMOS transistor M17 is a diode-connected transistor, even if a small amount of the drain current flows through the NMOS transistor M17, the threshold voltage is generated between the source and the drain of the NMOS transistor M17 thereby rapidly raising the voltage Vsf at the time t2 as shown by a solid line in FIG. 3. Therefore, the gate voltage of the NMOS transistor M23 forming a source follower circuit rapidly reaches the threshold voltage to thereby increase the error voltage Ve.

Since the phase compensating capacitor Ch is charged via a phase compensating resistor Rh, even though the number of electric charges in the phase compensating capacitor Ch is zero at the time t2, the voltage Vsf can rise at a high rate. Therefore, it is possible to greatly reduce a time until a first gate signal S1, which makes the switching transistor turn on, is output after the output current Io rapidly increases. Referring to FIG. 3, dotted lines indicate an output voltage Vo, an error voltage Ve and a voltage Vsf according to the technique without having an NMOS transistor M17 (BEFORE). As the NMOS transistor M17, it is preferable to use a transistor having a threshold voltage the same as the threshold voltage of the NMOS transistor M23 or slightly smaller than the threshold voltage of the NMOS transistor M23.

Figure 4:
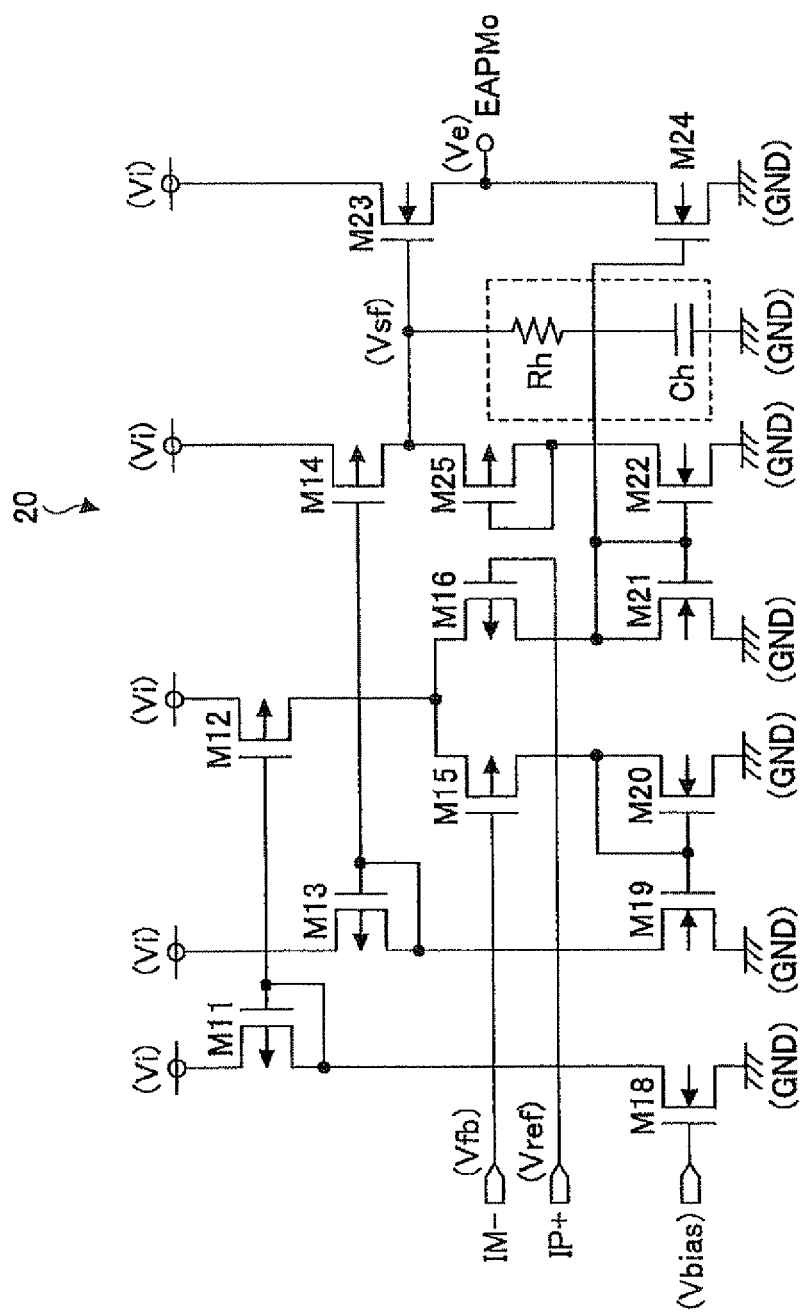
FIG. 4 illustrates another circuit example of the error amplifying circuit illustrated in FIG. 1.

FIG. 4 illustrates another circuit example of the error amplifying circuit 20 illustrated in FIG. 2. In FIG. 4, components the same as or similar to the components illustrated in FIG. 2 are designated by the same reference marks, and descriptions of these components are omitted and only a difference from the FIG. 2 is explained. The difference of FIG. 4 from FIG. 2 is that a PMOS transistor M25, which is a diode-connected transistor, is used instead of the NMOS transistor M17 as a voltage generating element. When the PMOS transistor M25 is used, a result similar to that using the NMOS transistor M17, which is a diode-connected transistor, as the voltage generating element in FIG. 2 is obtainable.

Figure 5:
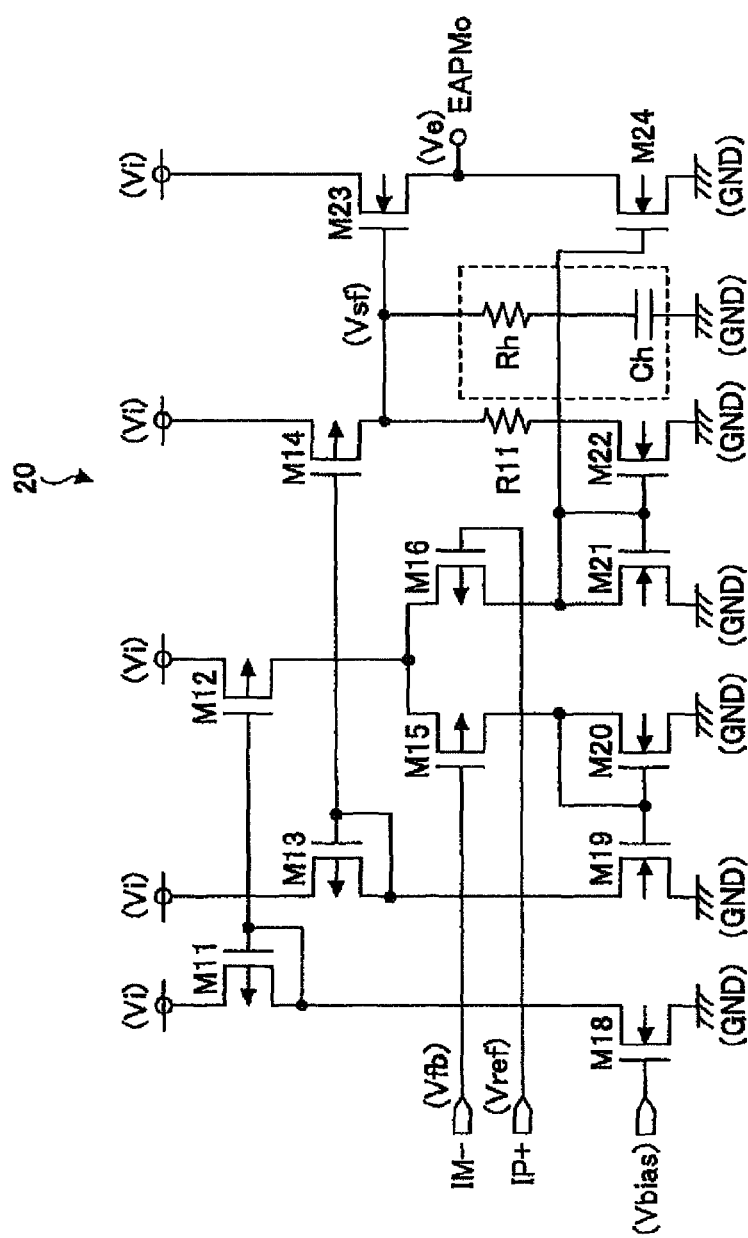
FIG. 5 illustrates another circuit example of the error amplifying circuit illustrated in FIG. 1.

FIG. 5 illustrates another circuit example of the error amplifying circuit 20. In FIG. 5, components the same as or similar to the components illustrated in FIG. 2 are designated by the same reference marks, and descriptions of these components are omitted and only a difference from the FIG. 2 is explained. The difference of FIG. 5 from FIG. 2 is that a resistor R11 is used instead of the NMOS transistor M17 as a voltage generating element. When the resistor R11 is used, a result similar to that using the NMOS transistor M17, which is a diode-connected transistor, as the voltage generating element in FIG. 2 is obtainable.

Figure 6:
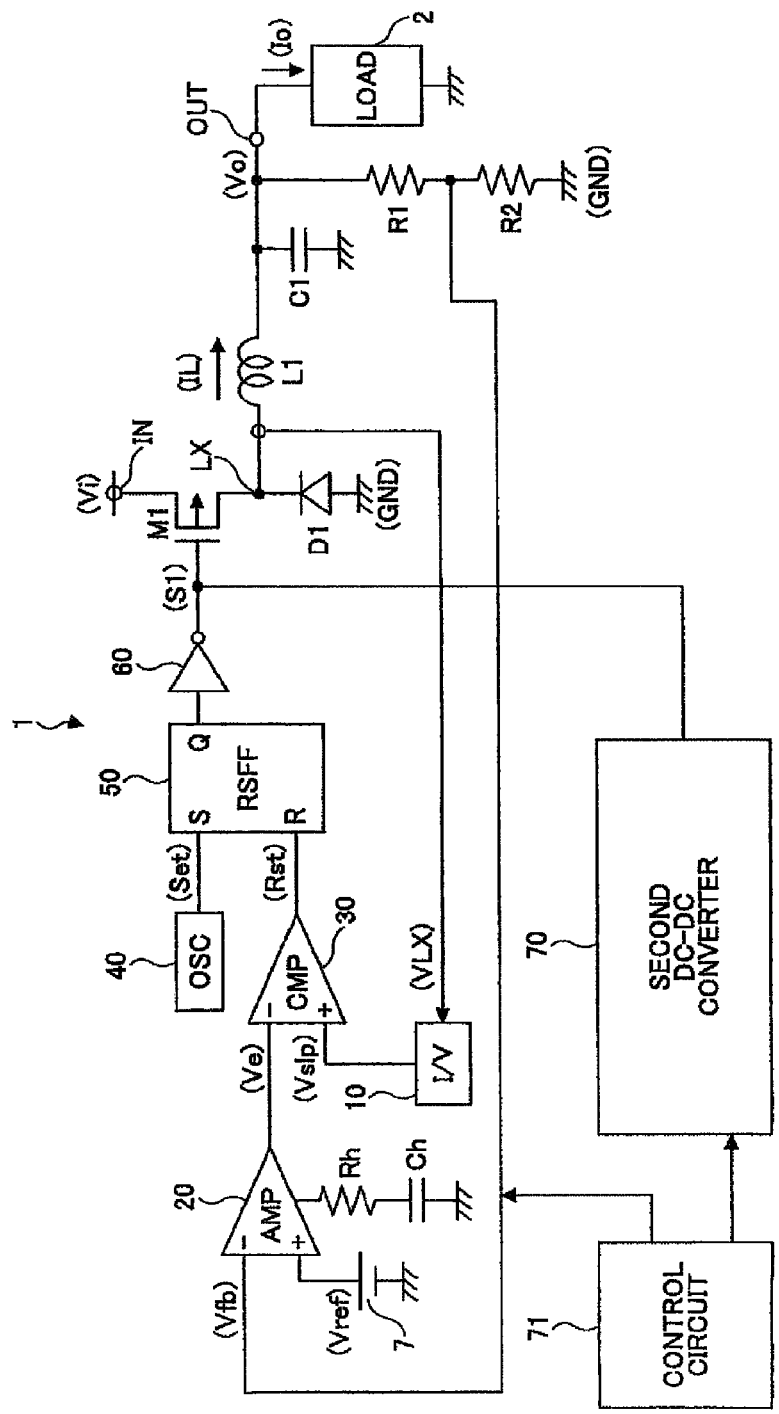
FIG. 6 illustrates an example of a power supply circuit using the switching regulator illustrated in FIG. 1.
Figure 7:
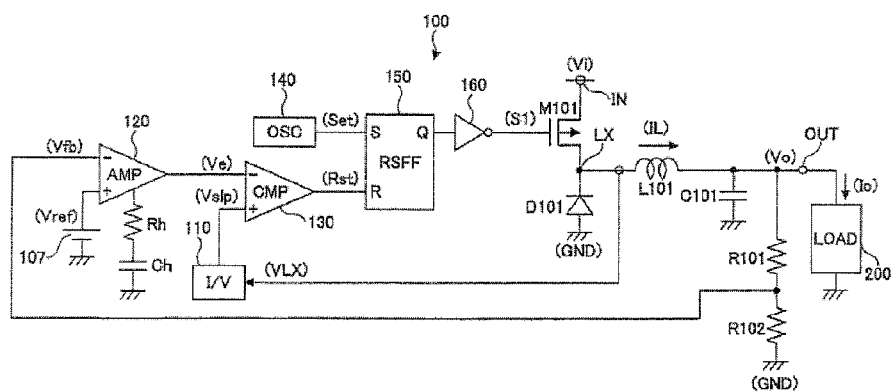
FIG. 7 illustrates a circuit example of a step-down switching regulator of a current mode control type in a related art.
Figure 8:
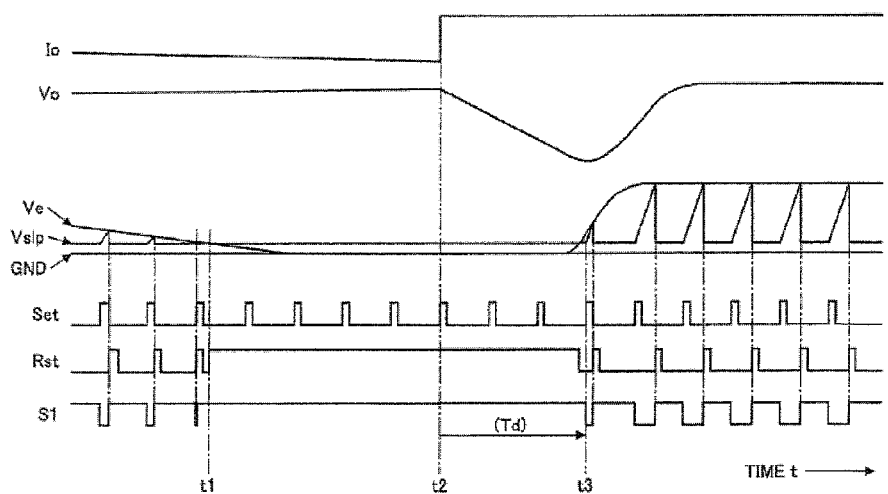
FIG. 8 is a timing chart illustrating an example of operation in the step-down switching regulator illustrated in FIG. 7.

FIG. 6 illustrates a power supply circuit arbitrarily using a switching regulator 1 or, when a load on the power supply circuit is light, a second DC-DC converter 70 having a power conversion efficiency higher than that of the switching regulator 1, or using, when a predetermined condition is established, either the switching regulator 1 or the second DC-DC converter 70, to convert an input voltage Vi to a predetermined voltage Vo and output Vo from an output terminal OUT. Referring to FIG. 6, the control circuit 71 outputs control signals to the switching regulator 1 and the DC-DC converter 70 so that the second DC-DC converter 70 converts the input voltage Vi to a predetermined voltage and outputs the converted voltage from the output terminal OUT when a switching signal is received from the outside or a predetermined condition is established (e.g. an output current Io as a load current is smaller than a predetermined value), and that the switching regulator 1 converts the input voltage Vi to a predetermined voltage when the predetermined condition is not established (e.g. the output current Io as the load current is the predetermined value or more)

The second DC-DC converter 70 has a configuration similar to the switching regulator 1. However, the second DC-DC converter 70 is set to have a smaller circuit operating current so that power conversion efficiency becomes high when the load current is small. When the load current rapidly increases, a gate voltage of an NMOS transistor M23 forming a source follower instantaneously reaches a threshold voltage thereby increasing an error voltage Ve to enable suppressing a drop of an output voltage Vo.

With the switching regulator of the Embodiment, the output circuit of the error amplifying circuit 20 is formed to have the source follower and the voltage generating element connected in series to the load of the output circuit of the differential amplifier circuit, which is positioned in the front stage. Therefore, it is possible to raise the gate voltage of the NMOS transistor M23 as the source follower when a slight current flows through the voltage generating element to thereby rapidly raise the error voltage Ve output from the error amplifying circuit 20. Thus, it is possible to suppress a substantial drop of the output voltage Vo.

In the above description, there has been described the switching regulator 1 that is the asynchronous rectification type step-down switching regulator. However, the present invention is not limited thereto. The present invention is also applicable to a synchronous rectification type using a NMOS transistor instead of the rectifying diode D1 and to linear regulators such as a step-up switching regulator, an inverting switching regulator, and a series regulator.

As described, the present invention is applicable to a power supply circuit which generates a feed-back voltage Vfb by dividing an output voltage Vo and controls operations of transistors so that the output voltage Vo has a predetermined constant value by operating an error amplifying circuit based on the feed-back voltage Vfb. Further, the present invention is also applicable to a current mode control type switching regulator which detects an inductor current IL flowing through an inductor L1 and controls an output transistor so that an output voltage Vo has a predetermined constant value by operating an error amplifying circuit based on the detected inductor current IL.

Since a DC-DC converter of the present invention is configured to form an output circuit of an error amplifying circuit as a source follower and connect, in series, a voltage generating element with a load of an amplifying circuit in a front stage of the output circuit, it is possible to raise a voltage of a control electrode an output transistor forming the source follower when only a slight current flows through the voltage generating element. Therefore, an error voltage output from the error amplifying circuit rapidly rises to avoid a substantial drop of an output voltage of the DC-DC converter.

Further, it is also possible to suppress a substantial output voltage drop when the DC-DC converter is switched to a second DC-DC converter having the power conversion efficiency higher than that of the DC-DC converter when a load is low.

The present invention is not limited to these embodiments, but variations and modifications may be made without departing from the scope of the present invention.

The present application is based on Japanese Priority Patent Application No. 2008-332650 filed on Dec. 26, 2008 with the Japan Patent Office, the entire contents of which are hereby incorporated by reference.

The invention claimed is:

1. A DC-DC converter which converts an input voltage input from an input terminal to a predetermined voltage and outputs the converted voltage from an output terminal, the DC-DC converter comprising:
   an output control transistor that carries out operation corresponding to a control signal input to a control electrode and controls the output voltage; and
   an operation control circuit that has an error amplifying circuit for amplifying a voltage difference between a predetermined reference voltage and a feedback voltage generated by dividing the output voltage and outputting the amplified voltage, and controls operation of the output control transistor to cause the output voltage to constantly be the predetermined voltage based on an error voltage, the error voltage being the output voltage difference, wherein the error amplifying circuit comprises:

an output circuit configured to output the error voltage and include an output transistor of a source follower connection;

a series circuit configured to include a resistor for phase compensation and a capacitor for phase compensation and be connected between a control electrode of the output circuit and a grounding voltage terminal; and an amplifying circuit configured to be positioned on a side more distant from a side outputting the error voltage relative to the output circuit in the error amplifying circuit, and include a voltage generating element as a load of the amplifying circuit.

2. The DC-DC converter according to claim 1,
wherein a threshold voltage value of the voltage generating element is the same as or smaller than a threshold voltage value of the output transistor of the source follower connection.

3. A power supply circuit comprising,
the DC-DC converter according to claim 1
a second DC-DC converter having a power conversion efficiency higher than a power conversion efficiency of the DC-DC converter under a light load; and
a control circuit configured to control operation of the DC-DC converter and the second DC-DC converter,
wherein the control circuit operates either one of the DC-DC converter and the second DC-DC converter arbitrarily or when a predetermined condition is established to cause the DC-DC converter or the second DC-DC converter to generate the output voltage and output the generated voltage from the output terminal.

4. The DC-DC converter according to claim 1,
wherein the voltage generating element generates a voltage the same as or smaller than a threshold voltage value of the output transistor of the source follower connection.

5. The DC-DC converter according to claim 1,
wherein the voltage generating element is a diode-connected MOS transistor.

6. A power supply circuit comprising,
the DC-DC converter according to claim 5;
a second DC-DC converter having a power conversion efficiency higher than a power conversion efficiency of the DC-DC converter under a light load; and
a control circuit configured to control operation of the DC-DC converter and the second DC-DC converter,
wherein the control circuit operates either one of the DC-DC converter and the second DC-DC converter arbitrarily or when a predetermined condition is established to cause the DC-DC converter or the second DC-DC converter to generate the output voltage and output the generated voltage from the output terminal.

7. The DC-DC converter according to claim 5,
wherein the voltage generating element generates a voltage the same as or smaller than a threshold voltage value of the output transistor of the source follower connection.

8. The DC-DC converter according to claim 5,
wherein a threshold voltage value of the voltage generating element is the same as or smaller than a threshold voltage value of the output transistor of the source follower connection.

9. The DC-DC converter according to claim 1,
wherein the voltage generating element is a resistor.

10. The DC-DC converter according to claim 9,
wherein a threshold voltage value of the voltage generating element is the same as or smaller than a threshold voltage value of the output transistor of the source follower connection.

11. The DC-DC converter according to claim 9,
wherein the voltage generating element generates a voltage the same as or smaller than a threshold voltage value of the output transistor of the source follower connection.

12. A power supply circuit comprising,
the DC-DC converter according to claim 9;
a second DC-DC converter having a power conversion efficiency higher than a power conversion efficiency of the DC-DC converter under a light load; and
a control circuit configured to control operation of the DC-DC converter and the second DC-DC converter,
wherein the control circuit operates either one of the DC-DC converter and the second DC-DC converter arbitrarily or when a predetermined condition is established to cause the DC-DC converter or the second DC-DC converter to generate the output voltage and output the generated voltage from the output terminal.

* * * * *